(12) United States Patent
Nishita et al.

(10) Patent No.: US 11,747,549 B2
(45) Date of Patent: Sep. 5, 2023

(54) ILLUMINATION DEVICE AND LIQUID CRYSTAL DISPLAY DEVICE

(71) Applicant: Japan Display Inc., Tokyo (JP)

(72) Inventors: Kazunari Nishita, Tokyo (JP); Ken Sugiyama, Tokyo (JP); Tetsuro Ochi, Tokyo (JP); Toshiyuki Tsubota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/730,260

(22) Filed: Apr. 27, 2022

(65) Prior Publication Data

US 2022/0252782 A1    Aug. 11, 2022

Related U.S. Application Data

(63) Continuation of application No. 17/148,007, filed on Jan. 13, 2021, now Pat. No. 11,346,997, which is a continuation of application No. 16/783,365, filed on Feb. 6, 2020, now Pat. No. 10,921,509, which is a continuation of application No. 16/523,003, filed on
(Continued)

(30) Foreign Application Priority Data

Apr. 27, 2016  (JP) .................................. 2016-089787

(51) Int. Cl.
*G02F 1/1335* (2006.01)
*F21V 8/00* (2006.01)
*G02F 1/1333* (2006.01)

(52) U.S. Cl.
CPC ...... *G02B 6/0088* (2013.01); *G02F 1/133308* (2013.01); *G02F 1/133512* (2013.01); *G02F 1/133528* (2013.01); *G02F 1/133314* (2021.01); *G02F 2202/28* (2013.01); *G02F 2203/01* (2013.01)

(58) Field of Classification Search
CPC ................................................. G02F 1/133512
See application file for complete search history.

(56) References Cited

U.S. PATENT DOCUMENTS

| | | | | |
|---|---|---|---|---|
| 2004/0046901 | A1* | 3/2004 | Matsuoka | G02F 1/133707 349/129 |
| 2010/0182535 | A1* | 7/2010 | Mifune | G02B 6/0028 349/62 |

(Continued)

FOREIGN PATENT DOCUMENTS

| | | | | |
|---|---|---|---|---|
| GB | 2549636 | * | 10/2017 | G02F 1/1335 |
| GB | 2549636 A | * | 10/2017 | G02B 6/0055 |
| JP | 2010-224000 | * | 10/2010 | G02F 1/1335 |

*Primary Examiner* — Sang V Nguyen
(74) *Attorney, Agent, or Firm* — Michael Best & Friedrich LLP

(57) ABSTRACT

According to one embodiment, an illumination device includes a light source disposed along a first direction, a light guide plate including a first end and a second end, the second end being positioned to be opposite to the first end in a second direction which crosses the first direction, a frame disposed along the second end and including an inner surface and an upper surface, and an adhesion member disposed on at least the upper surface of the frame, wherein the light source is disposed at the first end along the first direction, at least the inner surface of the frame is a light absorbing surface, and the adhesion member is light transmissive.

8 Claims, 9 Drawing Sheets

Related U.S. Application Data

Jul. 26, 2019, now Pat. No. 10,620,366, which is a continuation of application No. 15/494,807, filed on Apr. 24, 2017, now Pat. No. 10,408,994.

(56) References Cited

U.S. PATENT DOCUMENTS

| | | | |
|---|---|---|---|
| 2012/0169961 A1* | 7/2012 | Ha | G02F 1/133308 445/24 |
| 2015/0160401 A1* | 6/2015 | Namekata | G02F 1/133615 362/606 |
| 2015/0241731 A1* | 8/2015 | Jeong | G02B 6/0073 349/58 |
| 2017/0293067 A1* | 10/2017 | Watanabe | G02B 6/0065 |

* cited by examiner

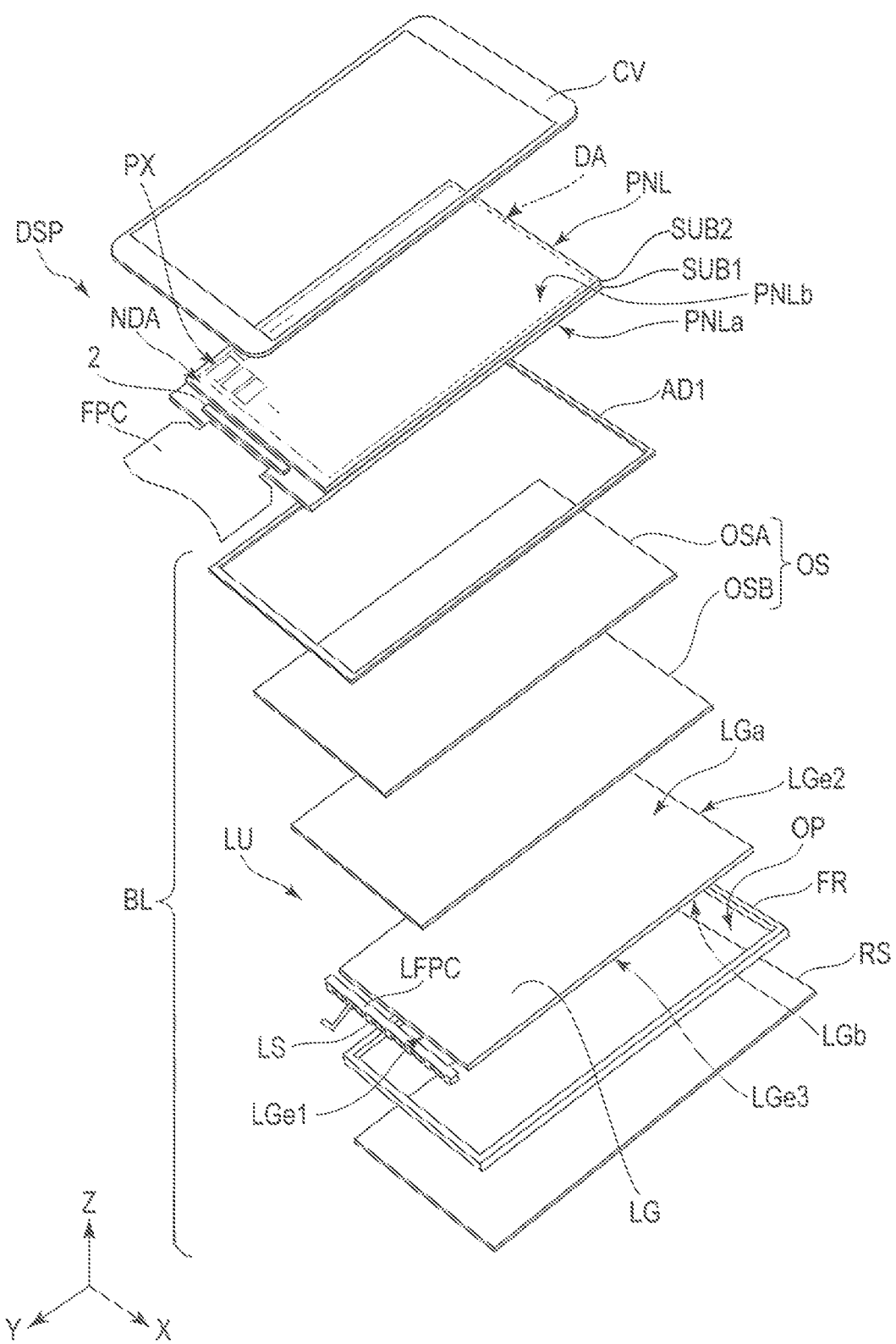
F I G. 1

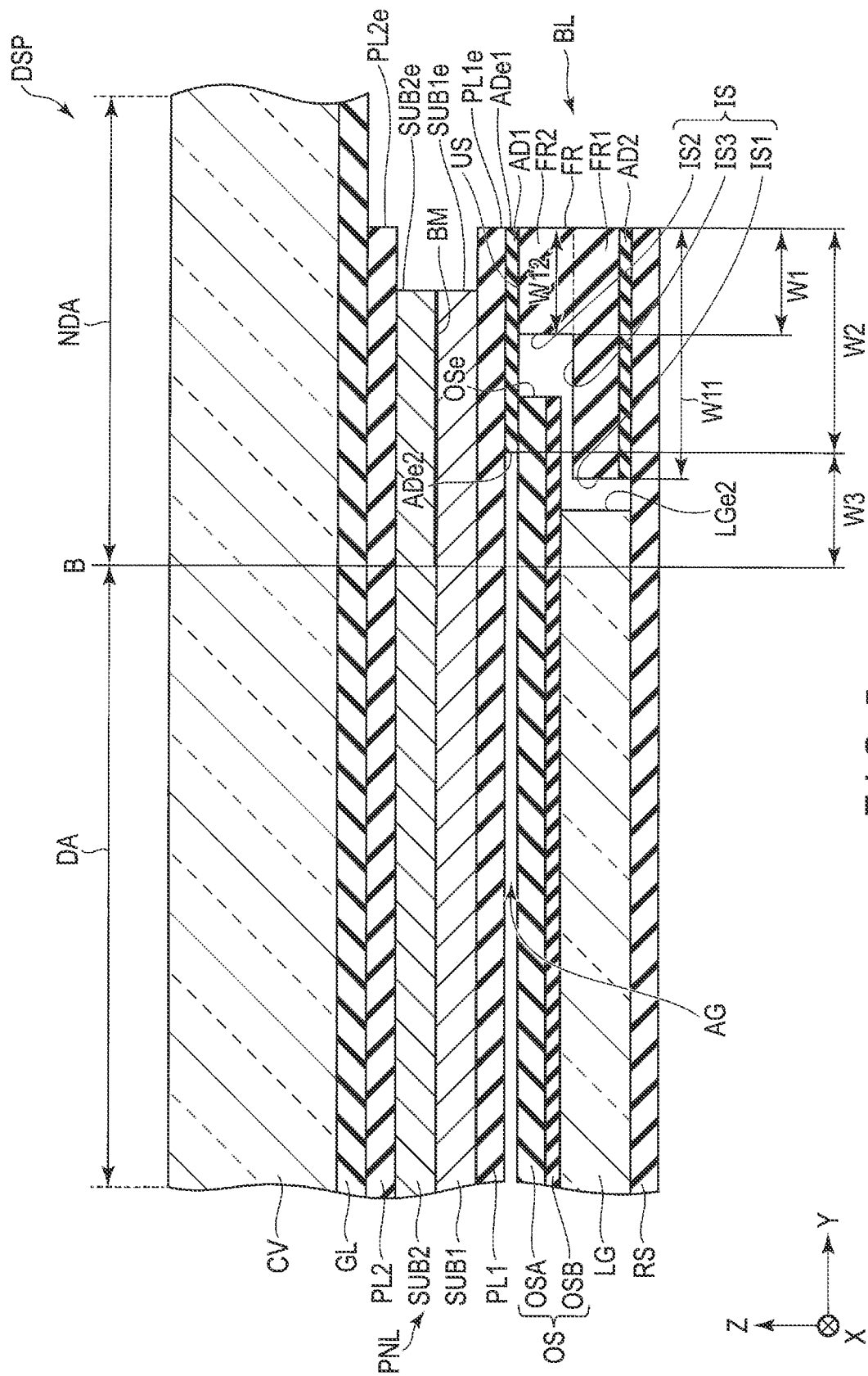
F I G. 5

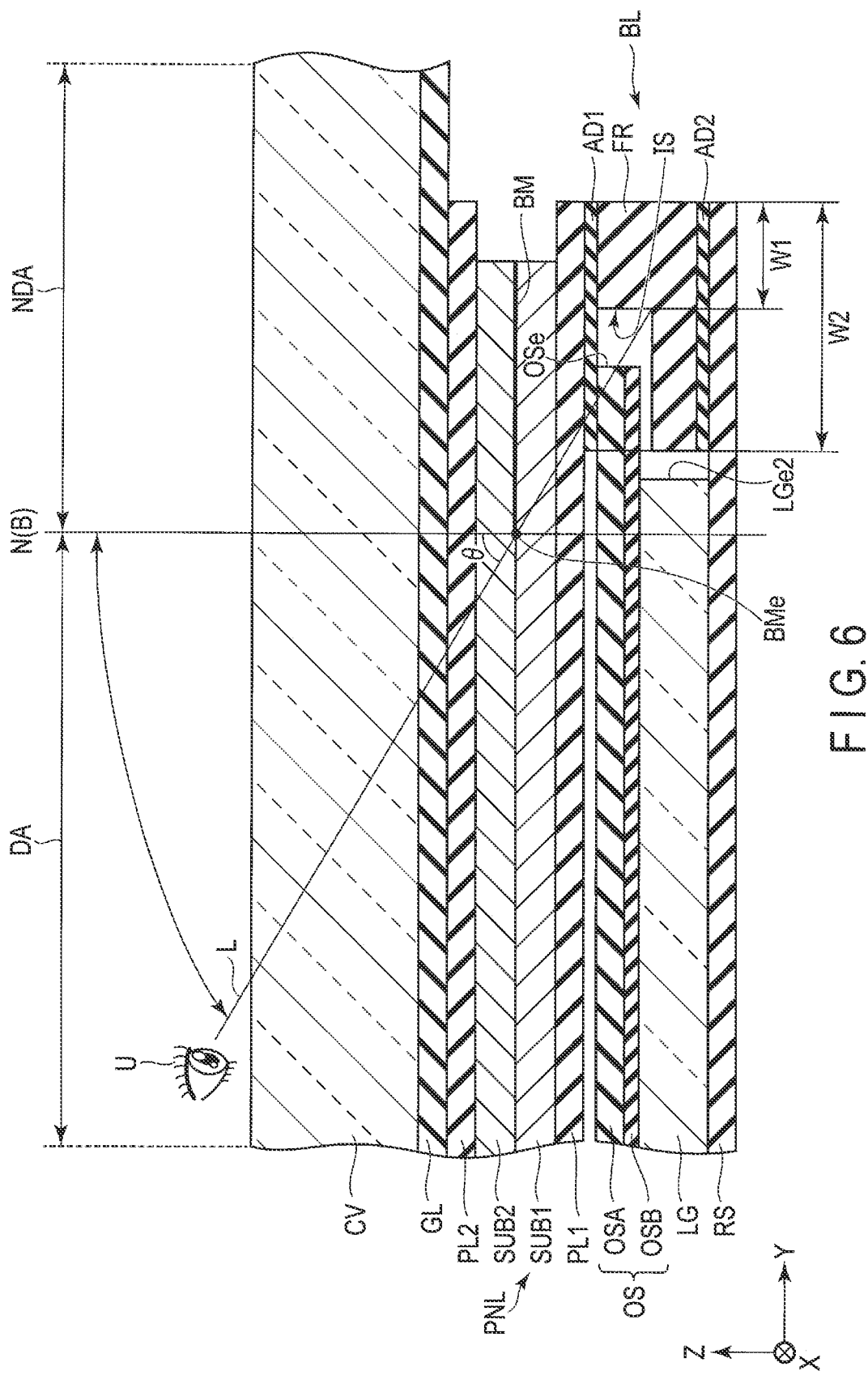
F I G. 6

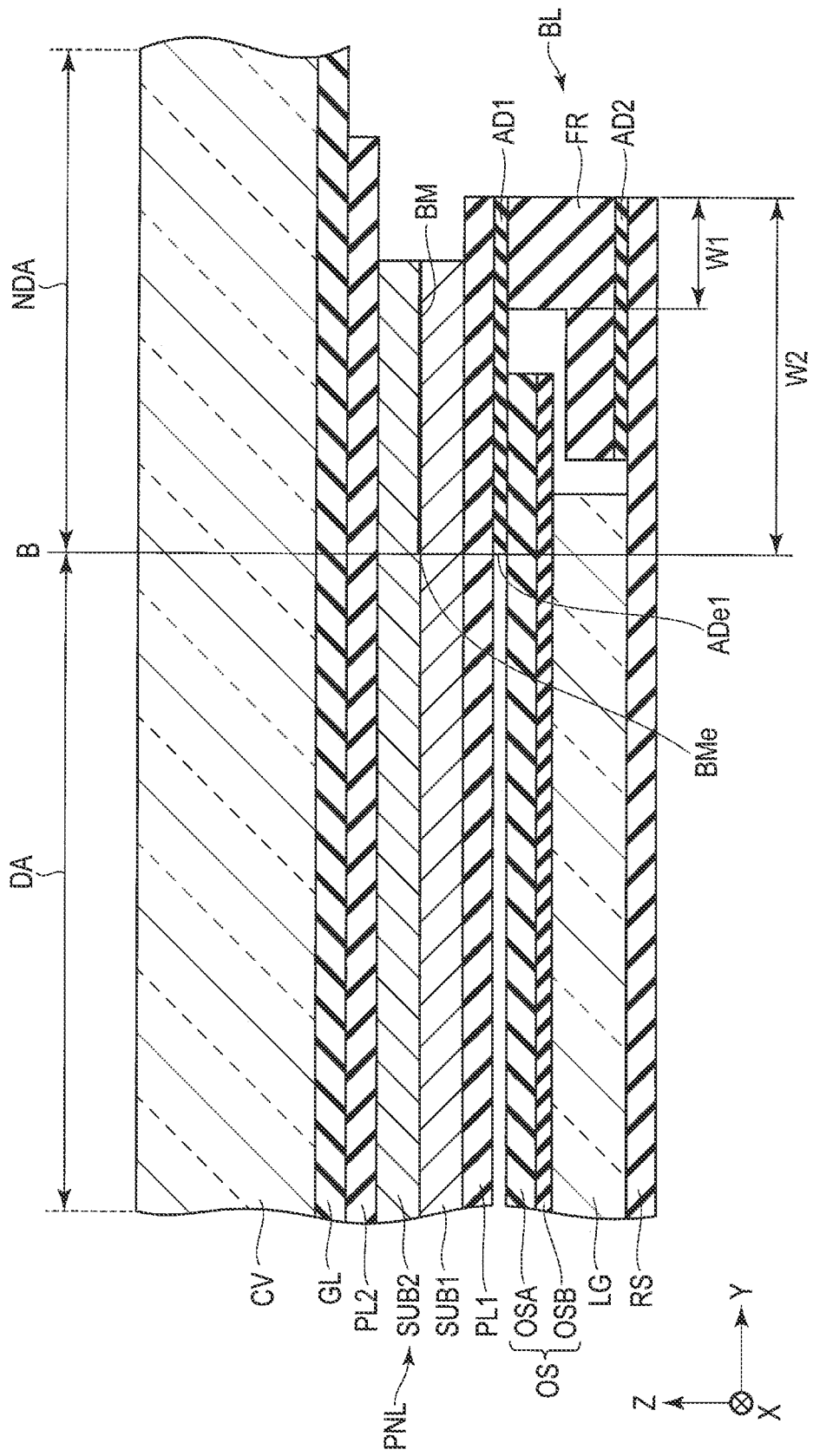
F I G. 8

ILLUMINATION DEVICE AND LIQUID CRYSTAL DISPLAY DEVICE

CROSS-REFERENCE TO RELATED APPLICATIONS

This application is a Continuation of application Ser. No. 17/148,007, filed Jan. 13, 2021, which, in turn, is a Continuation of application Ser. No. 16/783,365, filed Feb. 6, 2020, now U.S. Pat. No. 10,921,509 issued Feb. 16, 2021, which is a Continuation of application Ser. No. 16/523,003 filed Jul. 26, 2019, now U.S. Pat. No. 10,620,366 issued Apr. 14, 2020, which is a Continuation of application Ser. No. 15/494,807 filed Apr. 24, 2017, now U.S. Pat. No. 10,408,994 issued Sep. 10, 2019, which is based upon and claims the benefit of priority from Japanese Patent Application No. 2016-089787, filed Apr. 27, 2016, the entire contents of which are incorporated herein by reference.

FIELD

Embodiments described herein relate generally to an illumination device and a liquid crystal display device.

BACKGROUND

Liquid crystal display devices are used in various technical fields. Liquid crystal display devices include a display panel, a backlight unit as an illumination device, and the like. A backlight unit includes, for example, a light source, light guide plate, frame formed of a white resin, black adhesive sheet (light shielding doubled-sided tape), and the like.

Recently, display devices are required to have a thinner bezel structure and a bezel area where a backlight unit and a display panel are adhered is made significantly small. This makes it difficult to perform fine treatment of a light shielding double-sided tape, to precisely adhere the light shielding double-sided tape to the frame, and to precisely attach the backlight unit and the display panel. As a result, if there is a difficulty in treatment and adhesion of a light shielding double-sided tape, the light shielding double-sided tape may be recognized by a user or may block light passing through pixels, and the display quality may be deteriorated.

BRIEF DESCRIPTION OF THE DRAWINGS

FIG. 1 is a perspective view of the structure of a display device of an embodiment.

FIG. 5 is a cross-sectional view of the display device including ends of the light guide plate.

FIG. 6 shows a relationship between the adhesion member of the embodiment and a viewing angle of a user.

FIG. 8 shows a variation 2 of the adhesion member of the embodiment.

DETAILED DESCRIPTION

Figure 2:
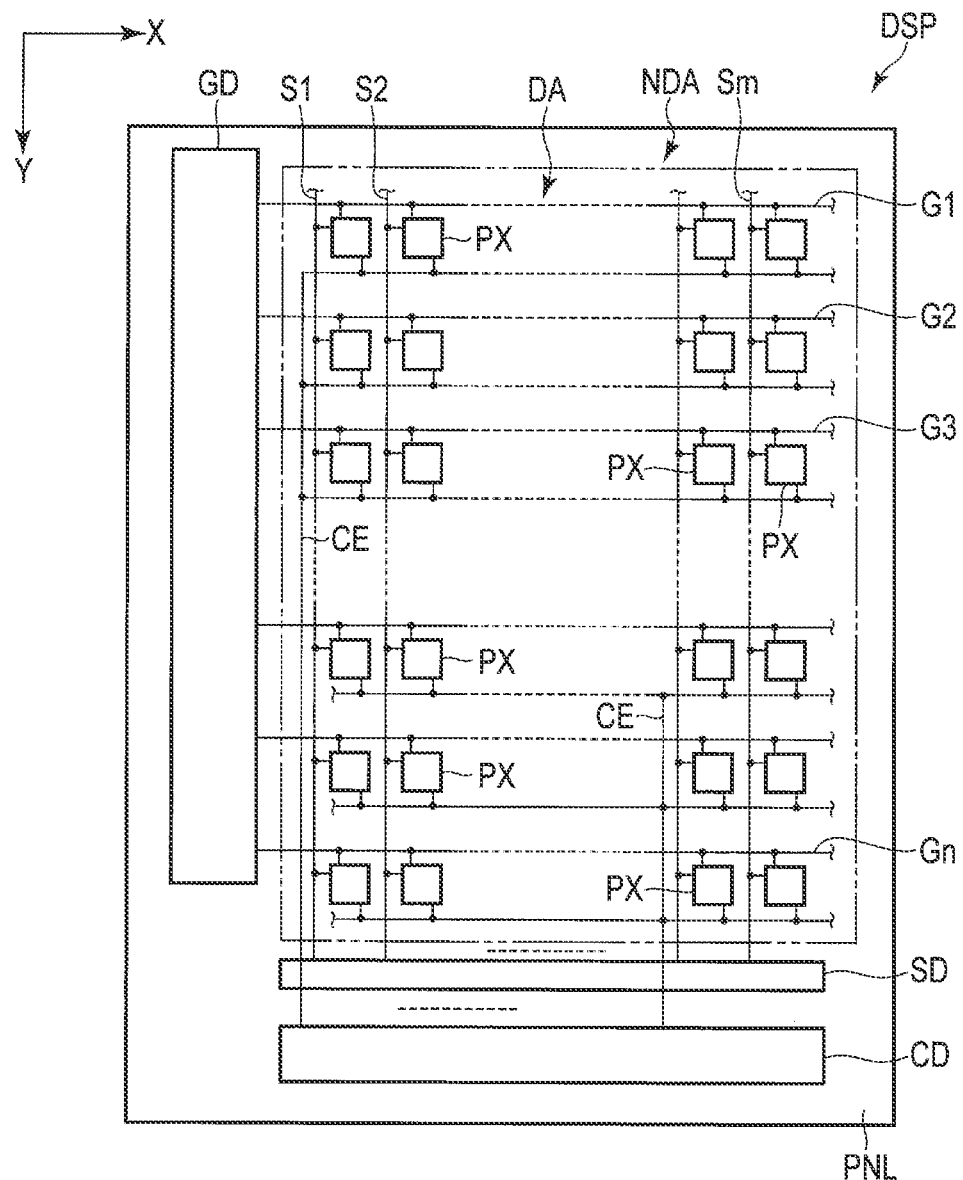
FIG. 2 shows the structure of the display device of the embodiment and an equivalent circuit thereof.

In general, according to one embodiment, an illumination device comprising: a light source disposed along a first direction; a light guide plate including a first end and a second end, the second end being positioned to be opposite to the first end in a second direction which crosses the first direction; a frame disposed along the second end and including an inner surface and an upper surface; and an adhesion member disposed on at least the upper surface of the frame, wherein the light source is disposed at the first end along the first direction, at least the inner surface of the frame is a light absorbing surface, and the adhesion member is light transmissive.

According to an embodiment, a liquid crystal display device comprising: a display panel including: a first substrate, a second substrate opposed to the first substrate, a liquid crystal layer held between the first substrate and the second substrate, and a polarizer adhered to the first substrate; and an illumination device which illuminates the display panel, wherein the illumination device comprises: a light source disposed along a first direction; a light guide plate including a first end and a second end, the second end being positioned to be opposite to the first end in a second direction which crosses the first direction; a frame disposed along the second end and including an inner surface and an upper surface; and an adhesion member disposed between the display panel and the frame and adheres the display panel and the frame, wherein the light source is disposed at the first end along the first direction, at least the inner surface of the frame is a light absorbing surface, and the adhesion member is light transmissive.

According to an embodiment, a liquid crystal display device comprising: a display panel including: a first substrate, a second substrate opposed to the first substrate, a liquid crystal layer held between the first substrate and the second substrate, and a light shielding layer disposed in a non-display area around a display area; and an illumination device which illuminates the display panel, wherein the illumination device comprises: a light source disposed along a first direction; a light guide plate including a first end and a second end, the second end being positioned to be opposite to the first end in a second direction which crosses the first direction; a frame disposed along the second end; and an adhesion member disposed between the display panel and the frame and adheres the display panel and the frame, wherein the light source is disposed at the first end along the first direction, the light shielding layer includes an end positioned in a boundary between the display area and the non-display area, and a light shielding member is not disposed, in a plane defined by the second direction and a third direction which crosses the first direction and the second direction, on a line passing the end of the light shielding layer and the frame, wherein the line is at an angle of 45 degrees with respect to the normal of the display panel.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. The schematic illustration is merely an example, and adds no restrictions to the interpretation of the invention. In the specification and drawings, the structural elements having functions, which are identical or similar to the functions of the structural elements described in connection with preceding drawings, are denoted by like reference numerals, and an overlapping detailed description will be omitted arbitrarily.

Initially, a display device of the present embodiment will be explained. In the present embodiment, a display device DSP is a liquid crystal display device. The liquid crystal display device is used in various devices such as smartphones, tablets, feature phones, personal computers, televisions, in-car devices, and gaming devices.

FIG. 1 is a perspective view showing the structure of the display device DSP of the present embodiment. In the figure, a first direction X, second direction Y, and third direction Z are orthogonal to each other; however, they may cross at angles other than 90 degrees. An X-Y plane defined by the first direction X and second direction Y are parallel to the main surface of the display device DSP and the third direction Z corresponds to a thickness direction of the display device DSP.

The display device DSP includes a display panel PNL, driver IC chip 2 which drives the display panel PNL, flexible printed circuit FPC, illumination device (backlight unit) BL which illuminates the display panel PNL, and cover CV.

The display panel PNL is a liquid crystal panel and includes a first substrate SUB1, a second substrate SUB2 opposed to the first substrate SUB1, and a liquid crystal layer held between the first substrate SUB1 and the second substrate SUB2. Note that the liquid crystal layer is extremely thin as compared to the thickness of the display panel PNL and is disposed inside the sealant which adheres the first substrate SUB1 and the second substrate SUB2, and thus, its depiction is omitted. Furthermore, the display panel PNL includes a display area DA in which an image is displayed, and a frame-like non display area NDA surrounding the display area DA. A plurality of pixels PX are disposed in a matrix in the display area DA. The drive IC chip 2 and the flexible printed circuit FPC are mounted on the first substrate SUB1 in the non-display area NDA.

The illumination device BL is disposed in one outer surface PNLa side of the display panel PNL (or a side opposed to the first substrate SUB1 of the display panel PNL). The illumination device BL includes, in the example depicted, an adhesion member AD1, sheet member OS, light guide plate LG, light unit LU, frame FR, and reflective sheet RS.

The sheet member OS is light transmissive and is disposed in the outer surface PNLa side. In the example depicted, the illumination device BL includes, as the sheet member OS, a prism sheet OSA or a diffusion sheet OSB, and may include a sheet of any different function in addition to the two sheets as depicted. In the example depicted, the sheet member OS is formed in a rectangular shape and is opposed to the display area DA. Note that the sheet member OS is not limited to a rectangular shape and may be a quadrangle two adjacent sides of which are not 90 degrees.

The light guide plate LG is formed as a flat plate and is opposed to the sheet member OS. The light guide plate LG includes a main surface LGA opposed to the sheet member OS, main surface LGB opposite to the main surface LGA, and ends LGe1, LGe2, and LGe3 which are side surfaces connecting the main surface LGa and the main surface LGb. The ends LGe1 and LGe2 extend in the first direction X and the end LGe3 extends in the second direction Y. The end LGe1 is, in the display panel PNL, opposed to the area where the driver IC chip 2 and the flexible printed circuit FPC are mounted in the third direction Z. The end LGe2 is disposed in the opposite side of the end LGe1 in the second direction Y.

The light unit LU includes a plurality of light sources LS arranged in the end LGe1 of the light guide plate LG in the first direction X, a flexible printed circuit LFPC in which the light sources LS are mounted, and the like.

The frame FR is disposed in the outer surface PNLa side. The frame FR is provided with at least the end LGe2 of the light guide plate LG. That is, the frame FR is disposed, in the end of the light guide plate LG, in the opposite side of the end LGe1 where the light sources LS are disposed. Or, the frame FR may be provided in a rectangular frame shape surrounding the light guide plate LG and the sheet member OS, or may be provided with the three sides surrounding the light guide plate LG and the sheet member OS excluding the end LGe1 where the light sources LS are disposed. In the example depicted, the frame FR is formed in a rectangular frame shape surrounding the light guide plate LG and the sheet member OS and includes a rectangular opening OP in the area opposed to the display area DA.

The reflective sheet RS is light reflective and is disposed in the light guide plate LG in its side opposed to the main surface LGB. Although this is not explained in detail, the reflective sheet RS is adhered to the frame FR. The reflective sheet RS and the frame FR as above function as a container to accommodate the light guide plate LG, sheet member OS, and light unit LU.

The adhesion member AD1 is formed in a rectangular shape and is disposed between the display panel PNL and the frame FR. As will be explained later, the adhesion member AD1 adheres the display panel PNL and the frame FR in a position opposed to the non-display area NDA of the display panel PNL. Thus, the illumination device BL and the display panel PNL are formed integrally.

The cover CV is disposed in the other outer surface PNLb side of the display panel (or, in the side opposite to the second substrate SUB2 of the display panel PNL). The cover CV is formed of, for example, glass. In that case, the cover CV will be referred to as a cover glass. Or, the cover CV may be formed of a light transmissive material such as a resin.

Note that the display device DSP structured as above corresponds to a transmissive liquid crystal display device having a transmissive display function which displays an image by selectively passing the light incident on the display panel PNL in each pixel PX. Note that the display device DSP may be a transflective liquid crystal display device having the transmissive display function and a reflective display function which displays an image by selectively reflecting outer light or auxiliary light.

FIG. 2 shows the structure of the display device DSP of the present embodiment. The display panel PNL includes, in the display area DA, scan lines G1 to Gn, signal lines S1 to Sm, and common electrode CE. The scan lines G1 to Gn extend in the first direction X and arranged in the second direction Y to be connected to a scan line drive circuit GD in the non-display area NDA. The signal lines S1 to Sm extend in the second direction Y and arranged in the first direction X to be connected to a signal line drive circuit SD in the non-display area NDA. Note that the scan lines G1 to Gn and the signal lines S1 to Sm may not extend linearly and may be partly bent. The common electrode CE is disposed over the pixels PX and is connected to a common electrode drive circuit CD in the non-display area NDA.

Figure 3:
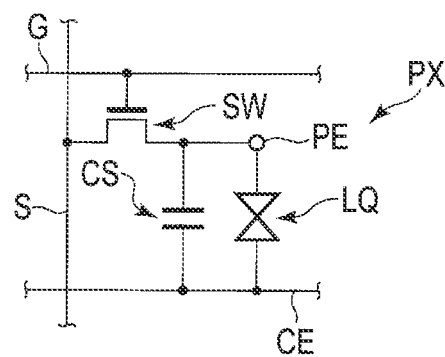
FIG. 3 shows an equivalent circuit of a pixel of FIG. 2.

FIG. 3 shows an equivalent circuit of a pixel PX of FIG. 2. The pixel PX includes a switching element SW, pixel electrode PE, common electrode CE, liquid crystal layer LQ, and the like. The switching element SW includes, for example, a thin film transistor (TFT) and is electrically connected to a scan line G and a signal line S. The pixel electrode PE is electrically connected to the switching element SW. The pixel electrode PE of each pixel PX is opposed to the common electrode CE and drives liquid crystal molecules in the liquid crystal layer LQ using a field produced between the pixel electrode PE and the common electrode CE. A capacitance CS is formed between, for example, an electrode having the potential equivalent to the common electrode and an electrode having the potential equivalent to the pixel electrode PE.

Figure 4:
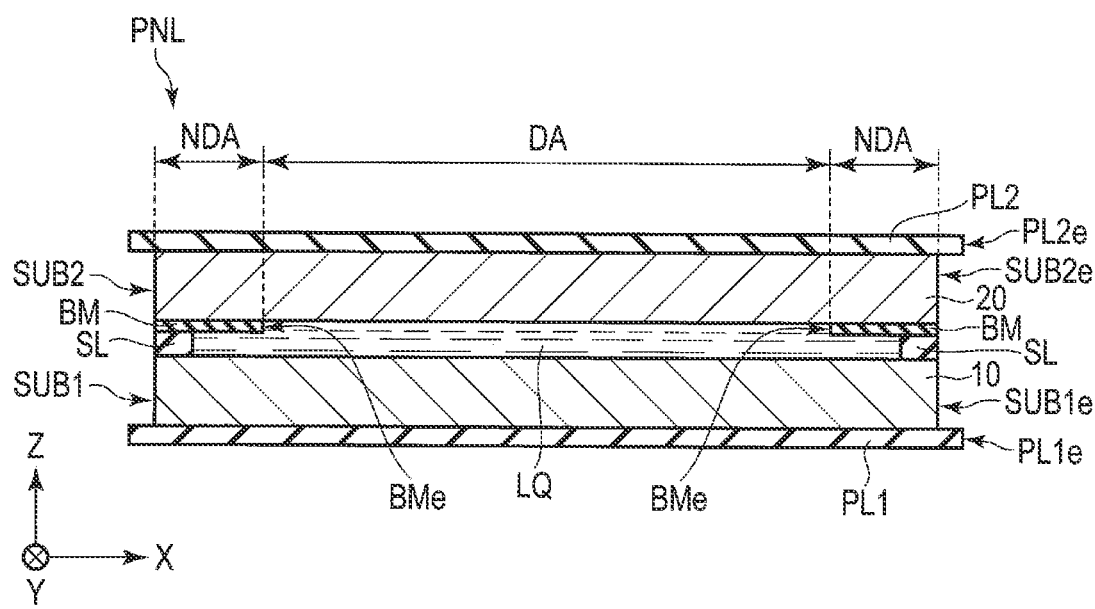
FIG. 4 is a cross-sectional view of the display panel.

FIG. 4 is a cross-sectional view of the display panel PNL. The display panel PNL includes the first substrate SUB1, second substrate Sub2, liquid crystal layer LQ, sealant SL, polarizer PL1, polarizer PL2, and the like.

The first substrate Sub1 includes a first insulating substrate 10 which is a light transmissive substrate such as a glass substrate or a resin substrate. Furthermore, the second substrate SUB2 includes a second insulating substrate 20 which is a light transmissive substrate such as a glass substrate or a resin substrate. For example, the first substrate SUB1 includes the above-mentioned scan line G, signal line S, switching element SW, pixel electrode PE, and the like. The common electrode CE is disposed in at least one of the first substrate SUB1 and the second substrate SUB2. The second substrate SUB2 includes a light shielding layer BM on the surface of the second insulating substrate 20 which is opposed to the first substrate SUB1. In the present embodiment, the light shielding layer BM disposed in the non-display area NDA is depicted alone, and the depiction of the light shielding layer disposed in the display area DA is omitted.

The light shielding layer BM is disposed in the entire area of the non-display area NDA. An end BMe of the light shielding layer BM is positioned in the boundary between the display area DA and the non-display area NDA. The light shielding layer which is not depicted is disposed in the display area DA to define each pixel and is disposed to be opposed to the lines such as scan lines, signal lines, and switching elements on the first substrate SUB1. Furthermore, the sealant SL is disposed in the non-display area NDA to adhere the first substrate SUB1 and the second substrate Sub2. The liquid crystal layer LQ is held in the area surrounded by the sealant SL between the first substrate SUB1 and the second substrate SUB2.

The polarizer PL1 is disposed on the surface of the first substrate opposite to its surface opposed to the second substrate SUB2. The polarizer PL1 is adhered to the first substrate SUB1. The polarizer PL2 is disposed on the surface of the second substrate SUB2 opposite to its surface opposed to the first substrate SUB1. The polarizer PL2 is adhered to the second substrate SUB2. Note that the polarizers PL1 and PL2 may include other optical elements such as a retardation plate. Furthermore, in the example depicted, the end PLe1 of the polarizer PL1 is disposed outside the end SUB1e of the first substrate SUB1 and the end PLe2 of the polarizer PL2 is positioned outside the end SUB2e of the second substrate SUB2. Details will be explained later.

FIG. 5 is a cross-sectional view of the display device DSP including the end LGe2 of the light guide plate LG. Note that, in a case where the frame FR is provided with the end LGe3 in the second direction Y, the cross-sectional shape of the display device DSP including the end LGe3 will be the same as the cross-sectional shape of FIG. 5, and the details thereof will not be explained here.

In the present embodiment, a direction from the non-display area NDA to the display area DA is defined as inward direction of the display device DSP and an opposite direction is defined as outward direction of the display device DSP. Furthermore, a direction from the first substrate SUB1 to the second substrate SUB2 is defined as up or above, and a direction from the second substrate to the first substrate SUB1 is defined as down or below. Furthermore, a description such as a second member above a first member or a second member below a first member means that the second member may contact or may be apart from the first member. In a case where the second member is apart from the first member, a third member may be interposed between the first member and the second member. A description such as a second member on a first member or a second member on the bottom of a first member means that the second member contacts the first member.

In the example depicted, the end PL1e of the polarizer PL1 and the end PL2e of the polarizer PL2 are disposed outside the end SUB1e of the first substrate SUB1 and the end SUB2e of the second substrate SUB2. Here, the display panel PNL is an illuminated object of the illumination device BL.

The cover CV is adhered to the polarizer PL2 by an adhesive agent GL. Note that the side of the cover CV opposite to its side opposed to the display panel PNL is a display surface side.

The light guide plate LG is disposed on the reflective sheet RS. The light guide plate LG is disposed in the display area DA and extends in the non-display area NDA. The end LGe2 of the light guide plate LG is disposed in the non-display area NDA. The sheet member OS is disposed on the light guide plate LG. The sheet member OS includes a sheet member OSA and a sheet member OSB, wherein the sheet member OSB overlaps the light guide plate LG and the sheet member OSA overlaps the sheet member OSB. The light guide plate LG, sheet member OSA, and sheet member OSB are, for example, layered without being adhered together. The sheet member OS is disposed in the display area DA and extends in the non-display area NDA. Furthermore, the sheet member OS extends in the direction going outside the light guide plate LG. That is, the end OSe of the sheet member OS is disposed in the non-display area NDA and is in the side apart from the boundary B between the display area DA and the non-display area NDA than is the end LGe2 of the light guide plate LG.

The frame FR is disposed above the reflective sheet RS. The frame FR is adhered to the reflective sheet RS by an adhesion member AD2. The frame FR includes an inner surface IS and an upper surface US surrounding the light guide plate LG and the sheet member OS. The inner surface IS and the upper surface US are arranged along the second end LGe2.

The inner surface IS includes, for example, a first surface IS1, second surface IS2, and third surface IS3. The first surface IS1 is opposed to the light guide plate LG in the second direction Y. The second surface IS2 is opposed to the sheet member OS in the second direction Y. The third surface IS3 is opposed to the sheet member OS in the third direction Z. In the example depicted, the first surface IS1 and the second surface IS2 are parallel to an X-Z plane which is defined by the first direction X and the third direction Z. The third surface IS3 is parallel to the X-Y plane which is defined by the first direction X and the second direction Y, and is orthogonal to the first surface IS1 and the second surface IS2. The first surface IS1 is opposed to the end LGe2 in the second direction Y. The second surface IS2 is opposed to the end OSe in the second direction Y. The third surface IS3 corresponds to a surface connecting the first surface IS1 and the second surface IS2, and is opposed to the sheet member OS extending in the direction going outside the light guide plate LG in the third direction Z.

Note that a space should be provided between the end LGe2 and the first surface IS1, between the end OSe and the second surface IS2, and between the sheet member OS and the third surface IS3 in consideration of thermal expansion and accuracy in the process of each member.

The upper surface US is opposed to the display panel PNL in the third direction Z. In the example depicted, the upper surface US is opposed to the polarizer PL1 of the display panel PNL. Note that the upper surface US may be opposed to the first substrate SUB1 without the polarizer PL1 interposed therebetween. The end SUB1e of the first substrate SUB1 and the end SUB2e of the second substrate SUB2 are positioned just above the upper surface US.

In the present embodiment, at least the inner surface IS of the frame FR functions as a light absorbing surface which absorbs the light. The frame FR can be formed of a material of low reflective ratio in a visible light range such as a black or gray material. Furthermore, coloring may be performed in the inner surface IS alone or in the entire surface of the frame FR.

The adhesion member AD1 is disposed on at least the upper surface US of the frame FR. In the example depicted, the adhesion member AD1 adheres the polarizer PL1 and the frame FR. Furthermore, the adhesion member AD1 extends over the sheet member OS from the upper surface US and overlaps the end OSe. In this state, the adhesion member AD1 adheres the polarizer PL1 and the frame FR and sheet member OS. Note that, if the upper surface US is opposed to the first substrate SUB1 without the polarizer PL1 interposed therebetween, the adhesion member AD1 may adhere the first substrate SUB1 and the frame FR. Furthermore, the adhesion member AD1 may adhere the first substrate SUB1 and polarizer PL1 and the frame FR.

In the present embodiment, the adhesion member AD1 is light transmissive and is a transparent double-sided tape or a transparent adhesive agent. Here, the word light transmissivity is defined that 60% or more, or preferably 70% or more of transmissivity is achieved where the transmissivity of the display panel PNL is given 100%. In this example, the adhesion member AD1 exerts 77% transmissivity where the transmissivity of the display panel PNL is given 100%. Note that, if the adhesion member AD1 is a transparent double-sided tape, the double-sided tape is, for example, a transparent polyethylene terephthalate (PET) with a transparent adhesive agent applied to both sides thereof. At that time, a non-transparent substance may be contained therein if the above transmissivty is satisfied. Furthermore, the same applies to a case where the adhesion member AD1 is a transparent adhesive agent, that is, a non-transparent substance may be contained therein if the above transmissivity is satisfied.

From a different view point, it is understood that the frame FR includes a first part FR1 which is adjacent to the light guide plate LG and a second part FR2 which is adjacent to the sheet member OS. The first part FR1 corresponds to a part on the reflective sheet RS and the second part FR2 corresponds to a part on the bottom of the display panel PNL. In the cross-section shown in the figure, the first part FR1 has a width W11 in the second direction Y and the second part FR2 has a width W12 in the second direction Y. Furthermore, the width W11 is greater than the width W12.

The upper surface US of the frame FR has the same width W12 as the second part FR2. Furthermore, the upper surface US overlaps with the adhesion member AD1 in the second direction Y, and the overlapping part of the upper surface US has a width W1. The adhesion member AD1 has a width W2 in the second direction Y. The width W2 is, preferably, set to be equal to or more than the width W1. The width W1 is half or less than the width W2. Furthermore, the adhesion member AD1 includes ends ADe1 and ADe2. The end ADe1 is an outer end and is positioned just above the upper surface US in the example depicted. The end ADe2 is an inner end and is positioned just below the light shielding layer BM and just above the sheet member OS in the example depicted. Note that, in the present embodiment, the end ADe1 corresponds to a fourth end and the end ADe2 corresponds to a fifth end. Here, a gap between the end ADe2 and the boundary B is referred to as a width W3. In the present embodiment, for example, the width W2 is approximately 0.3 to 0.8 mm, and the width W3 is approximately 0.3 to 0.4 mm. Here, a sum of the width W2 and the width W3 is set between 0.3 and 0.8 mm, or preferably, set to approximately 0.6 mm.

An air gap AG is formed between the sheet member OS and the display panel PNL. A height of the air gap AG in the third direction Z is the same as the thickness of the adhesion member AD1 in the third direction Z. For example, even if the adhesion member AD1 does not extend over the sheet member OS, the air gap AG is, preferably, formed between the sheet member OS and the display panel PNL to suppress deterioration in display quality.

FIG. 6 shows a relationship between the adhesion member AD1 of the present embodiment and an angle θ recognized by a user U. In FIG. 6, the angle θ is defined as an angle formed by the normal N of the display panel PNL passing through the end BMe of the light shielding layer BM and a line L connecting the user U and the end BMe. In the example depicted, the angle θ is 45 degrees. At that time, on the extension of line L, the adhesion member AD1, sheet member OS, and inner surface IS are arranged. Note that, in the present embodiment, the end BMe corresponds to a third end.

In the present embodiment, a state where the user U sees the display device DSP at the angle θ (which is 45 degrees) but cannot recognize some pixels because the light passing the pixels in the proximity of the end BMe is blocked by the adhesion member AD1 will be referred to as a lack of pixels.

In the present embodiment, the display panel PNL and the frame FR are adhered by the light transmissive adhesion member AD1. In the illumination device BL, light from the light source LS propagates in the light guide plate LG to be diffused by the sheet member OS and illuminates the display panel PNL. At that time, as shown by the line L, the light guided below the adhesion member AD1 passes through the light transmissive adhesion member AD1 and enters the display panel PNL. Thus, the user U can recognize the light passing the pixels in the proximity of the end BMe. That is, in the present embodiment, a lack of pixels by the adhesion member AD1 does not occur when the user U sees the display surface with the angle θ of 0 to 45 degrees. Thus, deterioration in display quality can be suppressed.

In the present embodiment, the adhesion member AD1 is light transmissive, and thus, the user U can recognize the light passing through the pixels in the proximity of the end BMe when the user U sees the display device DSP from the angle θ (which is 45 degrees). Note that, at that time, the incident light reaches the frame FR, and if a conventional white resin frame is used, the incident light is reflected by the frame and its surface periphery may be lit.

However, in the frame FR of the present embodiment, at least the inner surface IS is a light absorbing surface. Thus, even if the light propagating in the light guide plate LG leaks from the end LGe2 and the light diffused in the sheet member OS leaks from the end OSe, undesired light reflection and diffusion in the inner surface IS of the frame FR can be suppressed.

Therefore, the thin bezel structure can be achieved without deterioration in display quality.

Furthermore, in a heating experiment or the like, even if the light guide plate LG, sheet member OS, frame FR contract in the direction toward the display area DA from the non-display area NDA and the adhesion member AD1 reaches the display area DA, a lack of pixels can be suppressed.

Furthermore, the sheet member OS has an end OSe opposed to the frame FR in the second direction Y. The end OSe is disposed outside the end LGe2 of the light guide plate LG. Thus, the end LGe2 overlaps the sheet member OS in the third direction Z, and the light reflected by the end LGe2 is suitably diffused by the sheet member OS when the display panel PNL is viewed from the display surface side. Furthermore, the light reaching the end LGe2 is diffused between the sheet member OS and the frame FR by the sheet member OS. Thus, a bright line state where the end LGe2 is recognized locally bright can be suppressed.

Furthermore, the width W1 is, for example, half or less than the width W2. Thus, the present embodiment can be applied to a thinner bezel structure of the display device DSP.

(Variation 1)

Figure 7:
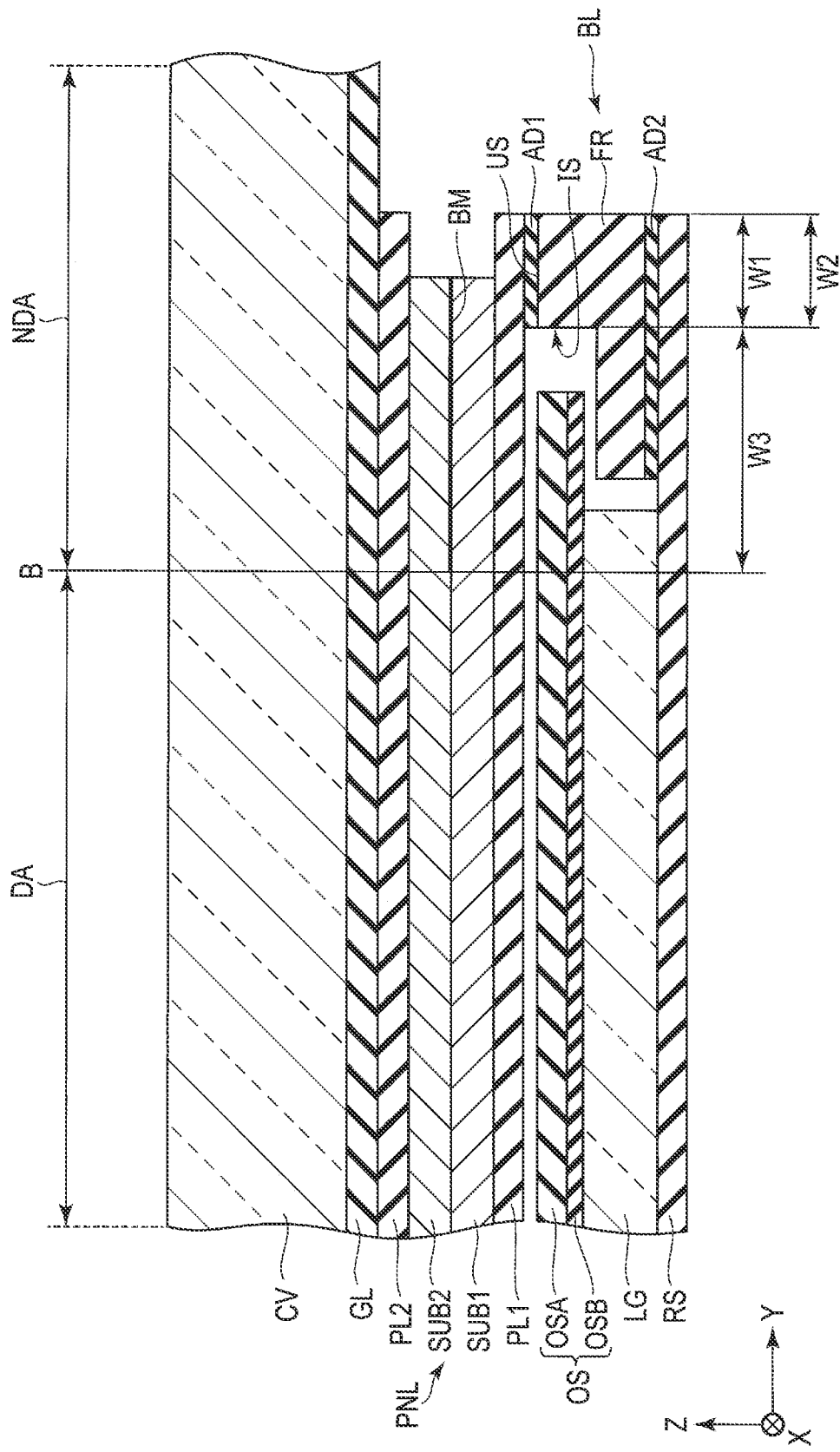
FIG. 7 shows a variation 1 of the adhesion member of the embodiment.

FIG. 7 shows a variation 1 of the adhesion member AD1 of the above embodiment.

In the variation 1 of FIG. 7, the adhesion member AD1 is disposed on the upper surface US alone. The adhesion member AD1 is not disposed over the sheet member OS. In the example depicted, the adhesion member AD1 is disposed on the entire surface of the upper surface US alone and the width W2 is the same as the width W1 of the upper surface US. In the present embodiment, the width W2 may be greater than the width W1, and in the example depicted, the width W2 is set to the lowermost value which is, in the present embodiment, approximately 0.3 mm. The lowermost value is determined such that a necessary adhesion strength between the display panel PNL and the frame FR can be secured.

In the structure shown in FIG. 7, a lack of pixels can be suppressed with or without the adhesion member AD1, and thus, in achieving the thin bezel structure of the display device DSP, the accuracy in process of the adhesion member AD1 and a margin in the adhesion of the display panel PNL and the frame FR can be secured. Furthermore, in order to improve the accuracy in process of the adhesion member AD1, materials or the like of the adhesion member AD1 are not restricted and the costs of the adhesion member AD1 can be suppressed. Furthermore, decrease in the production caused by misalignment of the adhesion member AD1 can be suppressed. Furthermore, since there is no need of expensive facilities to improve the alignment of the adhesion member AD1, the costs can be suppressed further.

(Variation 2)

FIG. 8 shows a variation 2 of the adhesion member AD1 of the above embodiment.

As compared to the variation 1 of FIG. 7, in the variation 2 of FIG. 8, the adhesion member AD1 has a greater width W2. The adhesion member AD1 extends from the upper surface US of the frame FR over the sheet member OS. The end ADe1 of the adhesion member AD1 is disposed in a position overlapping the end BMe of the light shielding layer BM. In the example depicted, the width W3 is zero and the width W2 is set to the uppermost value which is, in the present embodiment, approximately 0.8 mm. The uppermost value is determined such that visual discrepancy between pixels in the display area DA caused by the adhesion member AD1 extending over the display area DA (visual discrepancy between the pixels which do not overlap the adhesion member AD1 in the center of the display area and the pixels which overlap the adhesion member AD1 in the periphery of the display area DA) is not caused.

The width W2 is set to, preferably, a value between the lowermost value of FIG. 7 and the uppermost value of FIG. 8.

(Variation 3)

Figure 9:
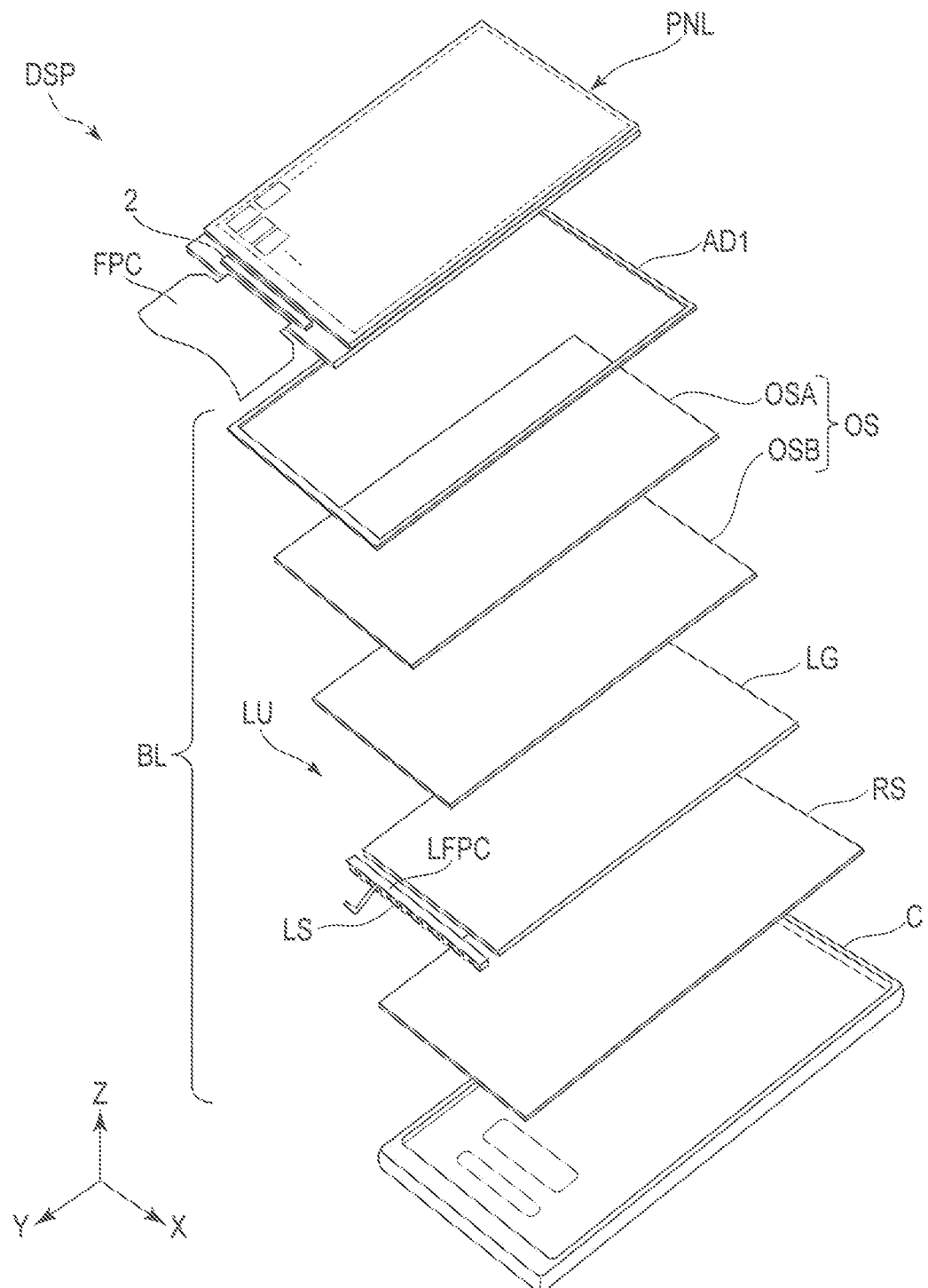
FIG. 9 is a perspective view showing a variation 3 of the display device of the embodiment.

FIG. 9 is a perspective view showing a variation 3 of the display device of the above embodiment. As compared to the example shown in FIG. 1, in the variation 3, the display device DSP includes a case C instead of the frame. The case C functions as a container in which the reflective sheet RS, light guide plate LG, optical sheet OS, and light unit LU are accommodated. The detailed structure of the case C will be explained with reference to FIG. 10.

Figure 10:
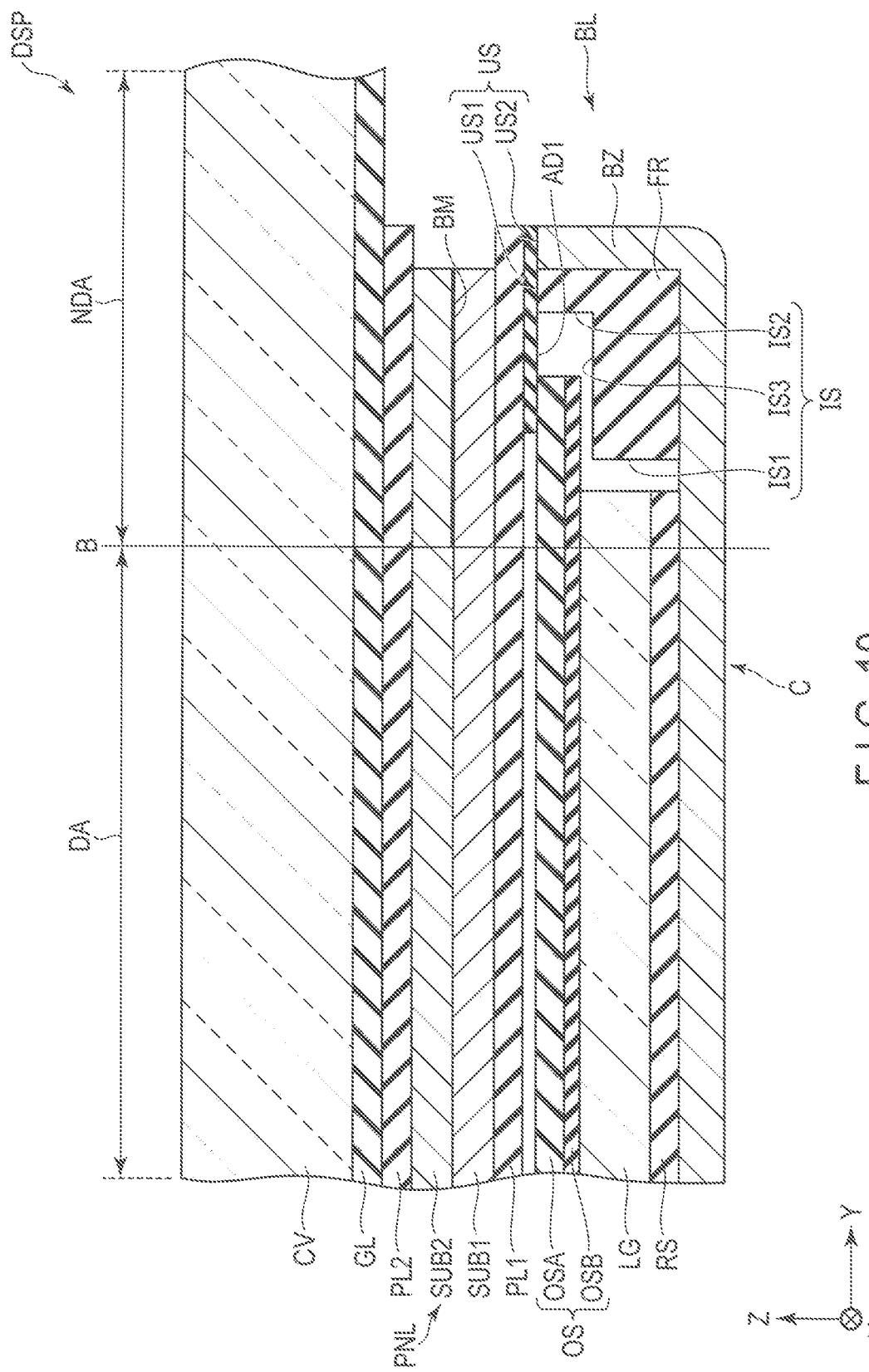
FIG. 10 is a cross-sectional view of the display device of FIG. 9.

FIG. 10 is a cross-sectional view of the display device of FIG. 9. The case C includes a frame FR and a bezel BZ. The frame FR corresponds to the frame of FIG. 1 and its detailed structure will be omitted. The bezel BZ is formed of a metal; however, it may be formed of a different material such as a resin. In the display area DA, the reflective sheet RS, light guide plate LG, and optical sheet OS are laminated on the bezel BZ in this order in the third direction Z. The case C includes the upper surface US. The upper surface US includes an upper surface US1 of the frame FR and an upper surface US2 of the bezel BZ. The upper surfaces US1 and US2 are parallel to the X-Y plane, and in the example depicted, the upper surface US1 and the upper surface US2 form the same flat surface. The adhesion member AD1 is disposed on the polarizer PL1 and between the upper surfaces US1 and US2. In the example depicted, the adhesion member AD1 is disposed between the polarizer PL1 and the sheet member OS.

In the variation 3, at least the inner surface IS of the frame FR is a light absorbing surface, and the adhesion member AD1 is light transmissive. Therefore, the same advantages described above can be achieved.

As can be understood from the above, the present embodiment can achieve an illumination device and a liquid crystal display device by which deterioration in the display quality can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of an illumination device and a liquid crystal display device achieved from the structures disclosed in the present application will be listed below.

(1) An illumination device comprising:

a light source disposed along a first direction;

a light guide plate including a first end and a second end, the second end being positioned to be opposite to the first end in a second direction which crosses the first direction;

a frame disposed along the second end and including an inner surface and an upper surface; and an adhesion member disposed on at least the upper surface of the frame, wherein the light source is disposed at the first end along the first direction, at least the inner surface of the frame is a light absorbing surface, and the adhesion member is light transmissive.

(2) The illumination device according to (1), wherein the frame is black.

(3) The illumination device according to (1), wherein the adhesion member is a transparent double-sided tape or a transparent adhesive agent.

(4) The illumination device according to (1), further comprising a sheet member disposed on the light guide plate, wherein the frame includes a first part adjacent to the light guide plate in the second direction, and, a second part adjacent to the sheet member in the second direction, and a width of the first part in the second direction is greater than a width of the second part in the second direction.

(5) The illumination device according to (4), wherein the inner surface includes a first surface, a second surface, and a third surface, and the first surface is opposed to the light guide plate in the second direction, the second surface is opposed to the sheet member in the second direction, and the third surface is opposed to the sheet member in a third direction which crosses the first direction and the second direction.

(6) The illumination device according to (1), wherein a width of the adhesion member in the second direction is equal to or more than a width of the upper surface in the second direction.

(7) The illumination device according to (1), wherein the upper surface overlaps with the adhesion member in the second direction, a width of the overlapping part of the upper surface is half or less than a width of the adhesion member in the second direction.

(8) The illumination device according to (4), wherein the adhesion member extends over the sheet member from the upper surface.

(9) A liquid crystal display device comprising:

a display panel including:

a first substrate, a second substrate opposed to the first substrate, a liquid crystal layer held between the first substrate and the second substrate, and a polarizer adhered to the first substrate; and an illumination device which illuminates the display panel, wherein the illumination device comprises:

a light source disposed along a first direction;

a light guide plate including a first end and a second end, the second end being positioned to be opposite to the first end in a second direction which crosses the first direction;

a frame disposed along the second end and including an inner surface and an upper surface; and an adhesion member disposed between the display panel and the frame and adheres the display panel and the frame, wherein the light source is disposed at the first end along the first direction, at least the inner surface of the frame is a light absorbing surface, and the adhesion member is light transmissive.

(10) The liquid crystal display device according to (9), wherein the adhesion member adheres the polarizer and the frame.

(11) The liquid crystal display device according to (9), further comprising a sheet member disposed on the light guide plate, wherein the adhesion member adheres the polarizer and the frame, and the polarizer and the sheet member.

(12) The liquid crystal display device according to (9), wherein the frame is black.

(13) The liquid crystal display device according to (9), wherein the adhesion member is a transparent double-sided tape or a transparent adhesive agent.

(14) The liquid crystal display device according to (9), further comprising a sheet member disposed on the light guide plate, wherein the frame includes a first part adjacent to the light guide plate in the second direction and a second part adjacent to the sheet member in the second direction, and a width of the first part in the second direction is greater than a width of the second part in the second direction.

(15) The liquid crystal display device according to (11), wherein the inner surface includes a first surface, a second surface, and a third surface, and the first surface is opposed to the light guide plate in the second direction, the second surface is opposed to the sheet member in the second direction, and the third surface is opposed to the sheet member in a third direction which crosses the first direction and the second direction.

(16) The liquid crystal display device according to (9), wherein a width of the adhesion member in the second direction is equal to or more than a width of the upper surface in the second direction.

(17) The liquid crystal display device according to (9), wherein the upper surface overlaps with the adhesion member in the second direction, a width of the overlapping part of the upper surface is half or less than a width of the adhesion member in the second direction.

(18) The liquid crystal display device according to (9), wherein the display panel includes a light shielding layer disposed in a non-display area surrounding a display area, and the light shielding layer includes a third end disposed in a boundary of the display area and the non-display area, and the adhesion member includes a fourth end disposed above the upper surface, and a fifth end disposed in a side closer to the third end than to the fourth end and below the light shielding layer.

(19) A liquid crystal display device comprising:

a display panel including:

a first substrate, a second substrate opposed to the first substrate, a liquid crystal layer held between the first substrate and the second substrate, and a light shielding layer disposed in a non-display area around a display area; and an illumination device which illuminates the display panel, wherein the illumination device comprises:

a light source disposed along a first direction;

a light guide plate including a first end and a second end, the second end being positioned to be opposite to the first end in a second direction which crosses the first direction;

a frame disposed along the second end; and an adhesion member disposed between the display panel and the frame and adheres the display panel and the frame, wherein the light source is disposed at the first end along the first direction, the light shielding layer includes an end positioned in a boundary between the display area and the non-display area, and a light shielding member is not disposed, in a plane defined by the second direction and a third direction which crosses the first direction and the second direction, on a line passing the end of the light shielding layer and the frame, wherein the line is at an angle of 45 degrees with respect to the normal of the display panel.

(20) The liquid crystal display device according to (19), wherein the frame is black and the adhesion member is transparent.

What is claimed is:

1. A liquid crystal display device comprising:
    a display panel including:
       a first substrate,
       a second substrate opposed to the first substrate,
       a liquid crystal layer held between the first substrate and the second substrate, and
       a polarizer adhered to the first substrate; and
    an illumination device which illuminates the display panel,
    wherein
    the illumination device comprises:
       light sources;
       a light guide plate including an end;
       a sheet member disposed between the light guide plate and the polarizer;
       a frame disposed along the end and including a first inner surface which is opposed to the light guide plate, a second inner surface which is opposed to the sheet member, and a first upper surface which is opposed to the display panel;
       a bezel which accommodates the light guide plate, the sheet member, and the frame and includes a second upper surface which is opposed to the display panel, and
       an adhesion member disposed between the polarizer and the first upper surface, also between the polarizer and the second upper surface,
    an end of the sheet member is closer to the frame than the end of the light guide plate,
    the adhesion member extends from the first upper surface toward the sheet member and does not overlap the light guide plate in a plan view, and
    an end of the adhesion member is disposed between the first inner surface and the second inner surface in a plan view.

2. The liquid crystal display device according to claim 1, wherein the bezel is in contact with an outer surface of the frame which is opposite to the first inner surface and the second inner surface.

3. The liquid crystal display device according to claim 1, wherein the bezel is formed of a metal.

4. The liquid crystal display device according to claim 1, wherein the adhesion member adheres the polarizer and the frame.

5. The liquid crystal display device according to claim 1, wherein the adhesion member adheres the polarizer and the frame, and the polarizer and the sheet member.

6. The liquid crystal display device according to claim 1, wherein the frame is black.

7. The liquid crystal display device according to claim 1, wherein the adhesion member is a transparent double-sided tape or a transparent adhesive agent.

8. The liquid crystal display device according to claim 1, wherein
    the adhesion member is exposed in the space between the sheet member and the frame, and
    the adhesion member is disposed between the sheet member and the polarizer.

* * * * *